Figure 1:
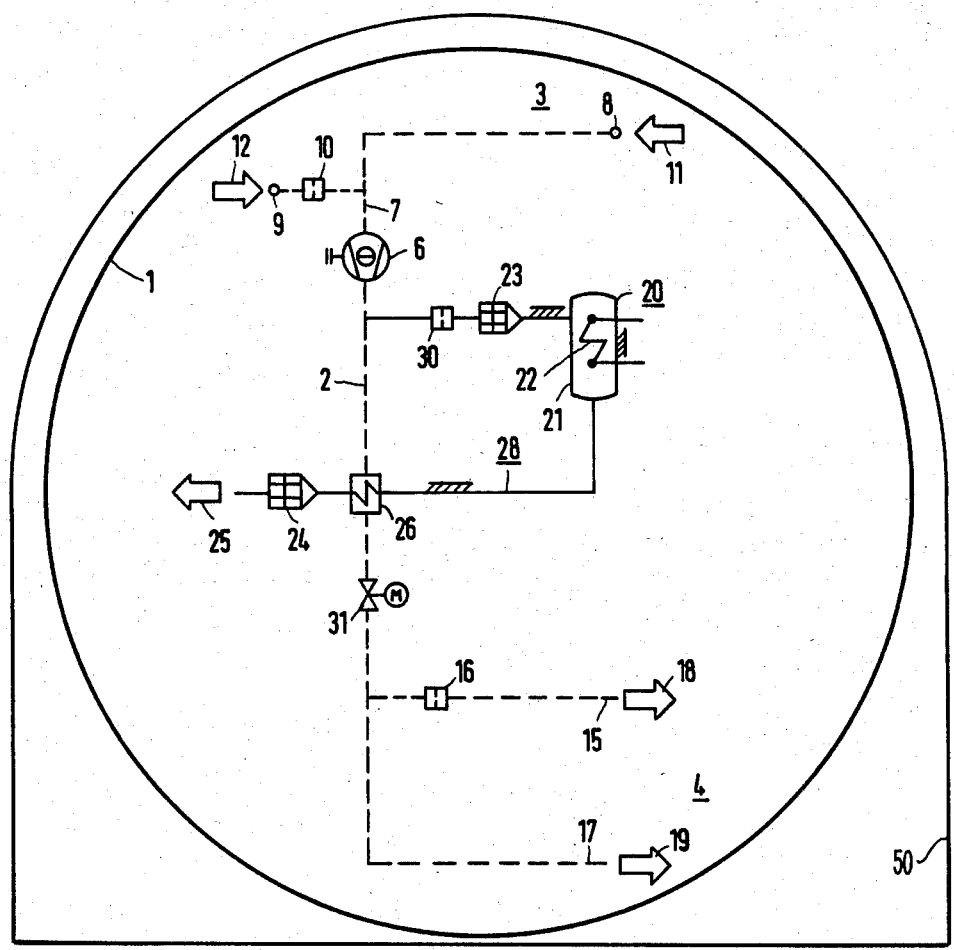

United States Patent [19]
Heck

[11] Patent Number: 4,631,164
[45] Date of Patent: Dec. 23, 1986

[54] NUCLEAR POWER STATION WITH A CONTAINMENT

[75] Inventor: Reinhard Heck, Hanau, Fed. Rep. of Germany

[73] Assignee: Kraftwerk Union Aktiengesellschaft, Mulheim, Fed. Rep. of Germany

[21] Appl. No.: 708,372

[22] Filed: Mar. 6, 1985

Related U.S. Application Data

[63] Continuation of Ser. No. 426,725, Sep. 29, 1982, abandoned.

[30] Foreign Application Priority Data

Nov. 5, 1981 [DE] Fed. Rep. of Germany ....... 3143989

[51] Int. Cl.⁴ ............................................. G21C 9/00
[52] U.S. Cl. ..................................... 376/300; 376/308
[58] Field of Search ............... 376/308, 300, 301, 310, 376/313, 314, 315, 283, 277, 307

[56] References Cited

U.S. PATENT DOCUMENTS

| | | | |
|---|---|---|---|
| 3,459,635 | 8/1969 | Bevilacqua et al. | 376/313 |
| 4,228,132 | 10/1980 | Weems et al. | 376/300 X |
| 4,430,293 | 2/1984 | Callaghan et al. | 376/314 |

FOREIGN PATENT DOCUMENTS

| | | | |
|---|---|---|---|
| 0073403 | 3/1983 | European Pat. Off. | 376/308 |
| 2928425 | 2/1980 | Fed. Rep. of Germany | 376/308 |
| 0131395 | 11/1978 | Japan | 376/308 |
| 0121390 | 9/1979 | Japan | 376/308 |
| 0116581 | 7/1984 | Japan | 376/308 |

Primary Examiner—Deborah L. Kyle
Assistant Examiner—Dan Wasil
Attorney, Agent, or Firm—Herbert L. Lerner; Laurence A. Greenberg

[57] ABSTRACT

Nuclear power station, including a containment for enclosing activity-carrying components having a given height and upper and lower parts, pipelines being extended in vertical direction in the containment over at least half of the given height thereof from the upper part to the lower part of the containment for mixing a gas atmosphere in the containment, the pipelines having an open top and bottom and an outlet in the lower part of the containment, a transporting device for mixing the gas atmosphere in the containment in the form of a blower connected in the pipelines for transporting gas from the upper part to the lower part of the containment in the pipelines, and a recombination device connected downstream of the blower in the pipelines for shunting the outlets thereof in the lower part and for targeted oxidation of free hydrogen within the containment.

4 Claims, 3 Drawing Figures

NUCLEAR POWER STATION WITH A CONTAINMENT

This application is a continuation of application Ser. No. 426,725, filed Sept. 29, 1982, now abandoned.

The invention relates to a nuclear power station with a containment for enclosing activity-carrying components, and a recombination device for the controlled oxidation of free hydrogen within the containment by means of pipelines which extend in the vertical direction over at least half the height of the containment in order to mix the gas atmosphere, the pipelines being open at the top and bottom thereof and being equippped with a transporting device for mixing the gas atmosphere in the containment and having the recombination device.

In nuclear power stations such as those described above and in German Published, Non-Prosecuted Application DE-OS No. 30 35 103, the pipelines are constructed in the form of shafts with relatively large cross sections which are equipped with heating devices because the gas flow is to be set in operation by a chimney effect. The flow direction in this case is naturally from the bottom up, so that hydrogen, which is found predominantly in the lower part of the containment, is transported into the upper part. The heating devices can be simultaneously used for the thermal recombination of the hydrogen if their temperature is chosen so that it is sufficient for combustion of the hydrogen.

While with the conventional apparatus discussed above the gas flow desired for mixing the gas content in the containment is obtained without moving parts, the uniformity of the hydrogen distribution, however, is not optimum because gases with high hydrogen concentration are suctioned off and their distribution in the upper part of the containment is left to chance. In addition, the heating required for the recombination may react to the gas flow desired for the mixing.

It is accordingly an object of the invention to provide a nuclear power station with a containment, which overcomes the hereinaforementioned disadvantages of the heretofore-known devices of this general type, and to improve the mixing of the gas atmosphere in the containment and the recombination effect.

With the foregoing and other objects in view there is provided, in accordance with the invention, a nuclear power station, comprising a containment for enclosing activity-carrying components having a given height and upper and lower parts, pipelines being extended in vertical direction in the containment over at least half of the given height thereof from the upper part to the lower part of the containment for mixing a gas atmosphere in the containment, the pipelines having an open top and bottom and an outlet in the lower part of the containment, a transporting device for mixing the gas atmosphere in the containment in the form of a blower connected in the pipelines for transporting gas from the upper part to the lower part of the containment in the pipelines, and a recombination device connected downstream of the blower in the pipelines for shunting the outlets thereof in the lower part and for targeted oxidation of free hydrogen within the containment.

While a blower with moving parts which may have to be serviced under some conditions and must be accident-proof is necessary for the invention, it has been found that this presents no difficulties in view of the servicing intervals which only last one year. A fact which is more important, on the other hand, is that the transporting direction of the blower from the upper part of the containment with a intake of gases with low hydrogen content, provides an improvement of the equalization. This is because the hydrogen concentration in the lower part of the containment is actively diluted, and is made turbulent, such as by higher flow velocities. It is only if the hydrogen which is displaced in the process from the lower part and which travels into the upper part of the containment over arbitrary paths, leads to a high concentration there, that the recombination device is acted upon by the same transporting device. The shunt construction assures that the possibility of undesired influence on the mixing flow is precluded. In other words, the recombination device can be constructed independently of the pipeline apparatus desired for the mixing. The use of this device is not limited to thermal recombination devices. Rather, catalytically operating recombinators can also be used.

In accordance with another feature of the invention, there are provided flame arresters disposed upstream and downstream of the recombination device. This is possible in the apparatus according to the invention, in contrast to the hereinafore-described conventional devices, where such flame arresters would interfere with the mixing flow.

In accordance with a further feature of the invention, there is provided a heat exchanger having a primary side connected downstream of the recombination device and a secondary side disposed in the part of the pipelines leading to the outlets and being shunted by the recombination device. In the way, the temperature of the gases produced in the recombination is lowered, for instance to 200°, so that there is no danger of excessive heating. At the same time, the gas used for the mixing is heated. It can therefore contribute to a desired drying process because of greater moisture absorption in the lower part of the reactor pressure vessel.

In accordance with a concomitant feature of the invention, the pipelines associated with the blower include a plurality of intake locations, and motor-actuated valves associated with the intake locations and outlets. In this case, local hydrogen accumulations can be counteracted in an intended manner or certian ventilation conditions can be taken into consideration. For instance, the fact the operating rooms provided in the interior of the containment are normally separated from equipment rooms in which the radiation level is higher, can be considered.

Other features which are considered as characteristic for the invention are set forth in the appended claims.

Although the invention is illustrated and described herein as embodied in a nuclear power station with a containment, it is nevertheless not intended to be limited to the details shown, since various modifications and structural changes may be made therein without departing from the spirit of the invention and within the scope and range of equivalent of the claims.

Figure 2:
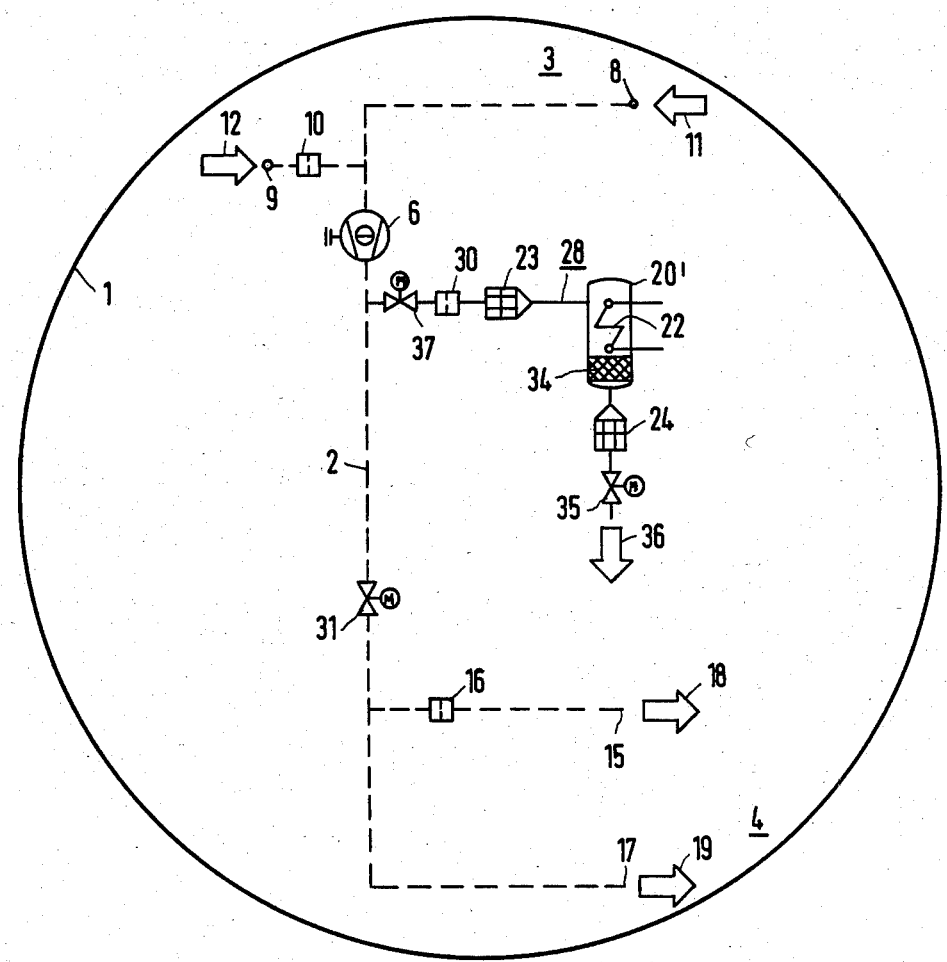
Figure 3:
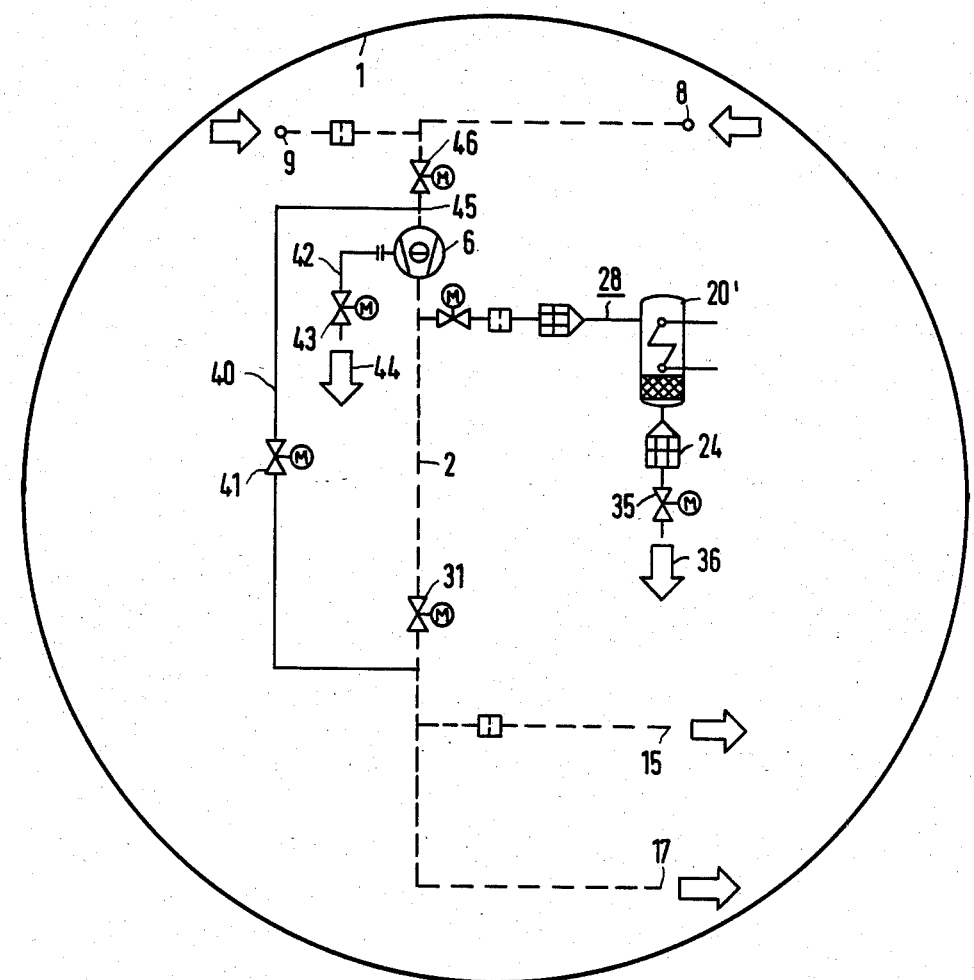

The construction and method of operation of the invention, however, together with additional objects and advantages thereof will be best understood from the following description of specific embodiments when read in connection with the accompanying drawings, in which:

FIGS. 1-3 are schematic and diagrammatic views of the three different embodiments of the nuclear power plant according to the invention.

Referring now to the figures of the drawing in which like reference symbols are used for identical parts, and first particularly to FIG. 1 thereof, there is seen a simplified presentation of a nuclear power station with a pressurized-water reactor, having a reactor building 50 for housing personnel during operation of the station, a containment 1 in the form of a steel sphere inside the building, in which the radiating components, particularly the primary loop but also less active auxiliary equipments as well as operation rooms, are disposed in a manner which is known per se. At least one line 2 which is indicated by broken lines and in the form of a pipe with a diameter of, for instance 200 mm, is provided in the containment. The line 2 extends from an upper region 3 in the interior of the containment 1, in which the operating rooms are located, downward in a vertical direction over almost the entire diameter of the sphere. A lower portion 4 of the containment 1 contains radiating components and a sump collecting leakage water at the bottom of the containment 1 which is not shown in detail. This lower portion 4 is therefore primarily endangered by free hydrogen.

The line 2 contains a blower 6, having an output direction which is from the top down. The capacity of the blower 6 is, for instance, 3,000 m³/h.

A first inlet 8 is provided in the dome of the containment 1 on an intake side 7 of the blower 6. A second inlet 9 is located somewhat lower than the first inlet 8 and is equipped with a choke 10 for adjusting the flow through with respect to the inlet 8. The flow direction is indicated by the arrows 11 and 12.

At the lower end of the line 2, a first upper outlet 15 is provided in the region 4. The flow through of the first outlet 15 can be adjusted by means of an aperture 16. A second outlet 17 leads to a lower point. The flow direction is indicated by the arrows 18 and 19.

Disposed downstream of the blower 6 is a shunt 28 with a recombination device 20 and lines passing through to the line 2 having the outlets 15 and 17. The recombination device 20 is primarily in the form of a vessel 21 with an electric heating system 22. The recombination device 20 is preceded by a flame arrester 23 and followed by a further flame arrester 24. A heat exchanger 26 is disposed between the recombination device 20 and the flame arrester 24, which practically speaking forms an outlet into the containment 1, as is shown by an arrow 25. The heat exchanger is acted upon on the primary side thereof by hot gas coming from the recombination device. The secondary side of the heat exchanger 26 carried cold gas from the line 2 which serves for mixing and is thereby heated up.

The line branch 28 with the recombination device 20 can be adjusted as to its flow through rate by means of an aperture 30 if the recombination device 20 is operated at the same time with the mixing flow. A valve 31 is motor-actuated and is closed during normal operation so as to ensure a separation between equipment and operating rooms with respect to ventilation.

In the embodiment example according to FIG. 2, the recombination device is provided in the form if a catalytically operating recombinator 20', because the heating device 22 is followed by substances serving for the catalysis in the form of clay balls 34 coated with rare metal. This provides a reduction of the temperature required for the recombination. For this reason, a separate cooling device can be omitted, so that the discharge takes place by way of a motor-actuated valve 35, directly into the interior of the containment 1, as is indicated by the arrow 36. A further motor-actuated valve 37 permits the recombination with its sensitive catalytic material 34 to be closed off, and permits the connection of the recombinator to the blower 6 only when required.

In the embodiment example according to FIG. 3, an apparatus which is basically identical to FIG. 2, is supplemented by further lines and valves. A line 40 with a motor-actuated valve 41 is provided parallel to the blower 6 and the part of the pipeline 2 leading to the valve 31. In addition, a further outlet line 42 with a motorized valve 43 is disposed at the blower 6. The valve 43 allows gas to flow in the direction of the arrow 44. A further motor-actuated valve 46 is provided between the inlets 8 and 9 and a connecting point 45 of the line 40.

It therefore becomes possible to also feed the blower from points other than the inlets 8 and 9. For instance, after the valve 46 and the valve 31 are closed and the valve 41 is opened, gas is drawn in through the outlets 15 and 17, conducted to the recombinator 20', and given off through the line 42. The valves in the individual line branches therefore allow localization of the suction effect for a spatially targeted use of the recombinator.

The foregoing is a description corresponding to German Application P No. 31 43 989.6, dated Nov. 5, 1981, the International priority of which is being claimed for the instant application and which is hereby made part of this application. Any discrepancies between the foregoing specification and the aforementioned corresponding German application are to be resolved in favor of the latter.

I claim:

1. Nuclear power station, comprising a reactor building for housing personnel during operation of the station, a containment inside said building for enclosing radioactive components having a given height and upper and lower parts, at least one pipeline being extended in vertical direction in said containment over at least half of said given height thereof from said upper part to said lower part of said containment for mixing a gas atmosphere in said containment, said at least one pipeline having an open top and bottom and an outlet in said lower part of said containment, a transporting device for mixing the gas atmosphere in said containment in the form of a blower connected in said at least one pipeline for transporting gas from said upper part to said lower part of said containment in said at least one pipeline, a recombination device in said containment having an inlet connected downstream of said blower in said at least one pipeline and an outlet for shunting said outlet of said at least one pipeline in said lower part and for targeted oxidation of free hydrogen within said containment, a heat exchanger having a primary side with a primary inlet connected to said outlet of said recombination device and a primary outlet for cooled gas, means for venting said cooled gas into said containment, said heat exchanger having a secondary side connected downstream of said inlet to said recombination device in said at least one pipeline leading to said outlet of said at least one pipeline and being shunted by said recombination device, and flame arrestors disposed upstream and downstream of said recombination device.

2. Pressurized-water nuclear power station, comprising a reactor building for housing personnel during operation of the station, a containment inside said building for enclosing radioactive components having a given height and upper and lower parts, at least one pipeline being extended in vertical direction in said containment over at least half of said given height thereof from said upper part to said lower part of said containment for mixing a gas atmosphere in said containment, said at least one pipeline having an open top and bottom and an outlet in said lower part of said containment, a transporting device for mixing the gas atmosphere in said containment in the form of a blower connected in said at least one pipeline for transporting gas from said upper part to said lower part of said containment in said at least one pipeline, a recombination device in said containment having an inlet connected downstream of said blower in said at least one pipeline and an outlet for shunting said outlet of said at least one pipeline in said lower part and for targeted oxidation of free hydrogen within said containment, a heat exchanger having a primary side with a primary inlet connected to said outlet of said recombination device and a primary outlet for cooled gas, means for venting said cooled gas into said containment, said heat exchanger having a secondary side connected downstream of said inlet to said recombination device in said at least one pipeline leading to said outlet of said at least one pipeline and being shunted by said recombination device, and flame arrestors disposed upstream and downstream of said recombination device.

3. Nuclear power station according to claim 1, wherein said at least one pipeline associated with said blower include a plurality of intake locations, and motor-actuated valves associated with said intake locations and said outlets.

4. Nuclear power station according to claim 2, wherein said at least one pipeline associated with said blower include a plurality of intake locations, and motor-actuated valves associated with said intake locations and said outlets.

* * * * *